(12) United States Patent
Koumura et al.

(10) Patent No.: US 7,629,720 B2
(45) Date of Patent: Dec. 8, 2009

(54) VEHICLE ALTERNATOR WITH IMPROVED END COVER STRUCTURE

(75) Inventors: Masatoshi Koumura, Okazaki (JP); Yoshiki Tan, Anjo (JP); Akihito Koike, Kariya (JP); Mikio Mashino, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/882,548

(22) Filed: Aug. 2, 2007

(65) Prior Publication Data

US 2008/0061641 A1 Mar. 13, 2008

(30) Foreign Application Priority Data

Sep. 7, 2006 (JP) .............................. 2006-242899

(51) Int. Cl.
*H02K 5/00* (2006.01)
(52) U.S. Cl. .......................................... 310/89; 310/88
(58) Field of Classification Search .................... 310/89, 310/68 D, 88
See application file for complete search history.

(56) References Cited

U.S. PATENT DOCUMENTS 6,294,856 B1 9/2001 Ishida et al.
6,664,699 B2 * 12/2003 Shioya et al. ............... 310/239
2001/0022477 A1 * 9/2001 Ishida ......................... 310/89
2007/0252488 A1 * 11/2007 Kusase et al. .............. 310/68 D

FOREIGN PATENT DOCUMENTS

| JP | A 2000-032720 | 1/2000 |
| JP | A 2000-139058 | 5/2000 |
| JP | A-2006-217739 | 8/2006 |

OTHER PUBLICATIONS

Office Action for Japanese Patent Application No. 2006-242899. Jun. 11, 2009. pp. 1-2.

* cited by examiner

*Primary Examiner*—Nguyen N Hanh
(74) *Attorney, Agent, or Firm*—Oliff & Berridge, PLC

(57) ABSTRACT

A vehicle alternator is disclosed having a stator, a rotor, a frame surrounding the stator and the rotor, a bowl-shaped end cover mounted on the frame and defining an electric component-part compartment, a brush unit held in sliding contact with slip rings of a rotary shaft, and a rectifier unit. The rectifier unit includes a terminal block embedded with A.C. conductive segments for multi-phase windings of a stator coil. The end cover includes a base wall portion and protective partitioned compartments axially protruding from a base wall portion of the end cover toward the frame at circumferentially spaced positions for the multi-phase windings, respectively, for surrounding at least one circumference of a connecting portion between an exposed end portion of each A.C. conductive segment and a diode lead and a connecting portion between the exposed end portion of each A.C. conductive segment and a stator lead.

6 Claims, 4 Drawing Sheets

VEHICLE ALTERNATOR WITH IMPROVED END COVER STRUCTURE

CROSS REFERENCE TO RELATED APPLICATIONS

This application is related to Japanese Patent Application No. 2006-242899, filed on Sep. 7, 2006, the content of which is hereby incorporated by reference.

BACKGROUND OF THE INVENTION

1. Technical Field of the Invention

The present invention relates to vehicle alternators and, more particularly, to a vehicle alternator having a protector cover structure.

2. Description of the Related Art

With vehicle alternators of the related art, it has been a usual practice for the vehicle alternator to include a protector cover, made of resin, which is fixedly mounted on a rear frame so as to cover a rear end face thereof for protecting a rectifier unit and a brush unit disposed on the vehicle alternator on one end face (hereinafter referred to as a rear end face) thereof in opposition to a drive pulley as disclosed in U. U. Patent No. 6294856 and Japanese Patent Application Publication No. 200-32720.

The rectifier unit of the vehicle alternator is disposed in a layout as simply described below.

With the vehicle alternator of the related art, the rectifier unit includes positive-side and negative-side heat radiator plates (hereinafter referred to as "positive-side and negative-side cooling fins"), which are axially spaced from each other by a given distance in face-to-face relation to the rear end face of the frame. Upper arm-side diodes are mounted on the positive-side cooling fin in a face-to-face relationship with each other and lower arm-side diodes are mounted on the negative-side cooling fin in a face-to-face relationship with each other. With the frame connected to the ground, it is normal practice for the negative-side cooling fin to be placed in a position near the rear end face of the frame and the positive-side cooling fin to be mounted on the resin-molded end cover that covers the rectifier unit. However, such a layout is not essential. The negative-side cooling fin is normally fixed to the rear end face of the rear frame with the same voltage potential. In an alternative, an attempt has heretofore been made to mount the lower arm-side diodes on the rear end face of the frame.

Each diode includes a bottomed cylindrical electrode terminal, a diode element having a bottom-side electrode surface fixed to the bottomed cylindrical electrode terminal, and a lead electrode terminal (hereinafter also referred to as a "diode lead") fixed to an upper electrode surface of the diode element and protruding along a central axis of the bottomed cylindrical electrode on an open side thereof with resin being charged to a desired area for insulating protection in a unitized fashion.

The positive-side and negative-side cooling fins are formed of substantially horseshoe-shaped (substantially "U-shaped plate") conductive metallic plates with opened ends thereof accommodating the brush unit and a voltage regulator. That is, the positive-side and negative-side cooling fins are designed to have a contoured space (also referred to as an "electric component-part compartment") as wide as possible in an area, axially overlapping the other electric component parts, on which no other electric component parts are present. This is because such a layout increases heat radiating surface areas of the positive-side and negative-side cooling fins to minimize the temperatures of the diode elements acting as power semiconductor elements Due to the increased heat radiating surface areas being needed, it has been a normal practice for the positive-side cooling fin to overlap the lower arm-side diodes fixed to the negative-side cooling fin as viewed in an axial direction. However, if the positive-side cooling fin radially overlaps the negative-side cooling fin to a great extent in excess, it becomes more likely that a short-circuited state occurs between the diode lead of the lower arm-side diode, protruding toward the positive-side cooling fin, and the positive-side cooling fin. Therefore, a need arises for ensuring a radial clearance between a circumferential edge portion of the positive-side cooling fin and the diode lead of the lower arm-side diode. To address such an issue, it has been known to have a structure wherein a partition wall portion is formed protruding from the plastic cover for electrical insulation in an area between the circumferential edge portion of the positive-side cooling fin and the diode lead of the lower arm-side diode.

Further, it has been a normal practice for the rectifier unit to include a terminal block intervening between the positive-side and negative-side cooling fins. The terminal block is comprised of a plastic plate embedded with A.C. conductive segments of various phases with the A.C. conductive segments of each phase interconnecting the diode leads and the stator leads in each phase.

SUMMARY OF THE INVENTION

The present invention has been completed with a view to addressing the above issues and has an object to provide a vehicle alternator that can prevent an increase in physical size while minimizing a heat transfer from a cooling fin to a brush unit.

To achieve the above object, one aspect of the present invention provides a vehicle alternator comprising a frame surrounding a stator, having a stator coil formed in multi-phase windings, and a rotor rotatably disposed in an area inside the stator, a bowl-shaped end cover, made of resin, which is mounted on an end face of the frame to cover the same for defining an electric component-part compartment, a rectifier unit fixedly mounted on the end face of the frame and accommodated in the electric component-part compartment, and stator leads extending through the frame from the stator coil of the stator into the electric component-part compartment. The rectifier unit includes a positive-side cooling fin to which cathode electrodes of upper arm-side rectifying elements and an output terminal are fixed, a negative-side cooling fin to which anode electrodes of lower arm-side rectifying elements are fixed and a terminal block embedded with A.C. conductive segments for respective phases each providing electrical connection between a diode lead acting as the anode electrode of the upper arm-side rectifying element and a diode lead acting as the cathode electrode of the lower arm-side rectifying element for each phase. The end cover includes a base wall portion, made of resin and mounted on the end face of the rear frame in face-to-face relation thereto, and a plurality of protective partitioned compartments, integrally formed with the base wall portion at circumferentially spaced positions for the multi-phase windings, respectively, which axially protrude from the base wall portion toward the frame and each of which has both radially outward ends contiguous with an inner periphery of a circumferential wall portion of the base wall portion. Each of the protective partitioned compartments surrounds at least one circumference of a connecting portion between an exposed end portion of each of the A.C. conductive segments and the diode lead and a connecting portion between the exposed end portion of each of the A.C. conductive segments and the stator lead.

With the structure of the vehicle alternator of the present embodiment, the end cover includes a plurality of protective partitioned compartments each of which surrounds a circumference of the connecting portion between the exposed terminal of each A.C. conductive segments and the diode lead or the stator lead. As used herein, the term the "circumference of the connecting portion" refers to a circumference of the connecting portion appearing in a radial cross section of the vehicle alternator. With such a structure, even if filthy water or salt water is splashed into the end cover, that is, the electric component-part compartment from cooling airflow windows formed in the end cover made of resin, the protective partitioned compartments can effectively prevent filthy water or salt water from adhering onto the connecting portion and relevant vicinity from the circumference of the connecting portion. This enables an increase in effective opening surface areas of the cooling airflow windows of the end cover for the purpose of increasing cooling capability of the rectifier unit without causing any issue of creeping discharge and salt corrosion caused on the connecting portion. In addition, each protective partitioned compartment has a radial cross section in which both radial ends of a partition wall are contiguous with the circumferential wall portion of the end cover. This enables a remarkable increase in mechanical strength of the resin-made end cover, that is, mechanical strength and rigidity of the resin-made end cover in a structure close proximity to the connecting portion. This results in a capability of reducing a thickness of the end cover by that extent. The connecting portion has less mechanical strength than each electric component appearing in the resin-made end cover. In contrast, the partition wall of the protective partitioned compartment, surrounding the connecting portion, provides an increase in mechanical strength of the resin-made end cover in a localized area thereof at a position of close proximity to the connecting portion. This suppresses an increase in the amount of resin to be used for fabricating the end cover while preventing damage to the resin-made end cover due to external impact force in an area near the connecting portion. Thus, the protective partitioned compartment reliably prevents an external force from acting on the connecting portion and the occurrence of failure caused by incurred water droplets coming from damaged area. In a preferred embodiment, the protective partitioned compartment is preferably formed in a C-shape in radial cross section.

With the vehicle alternator of the illustrated embodiment, each of the protective partitioned compartments may preferably surround both circumferences of the connecting portion between the exposed end portion of each of the A.C. conductive segments and the diode lead and the connecting portion between the exposed end portion of each of the A.C. conductive segments and the stator lead.

With such a structure, the protective partitioned compartment for one phase can surround both circumferences of two connecting portions in one phase. This enables the suppression of an increase in the amount of material to be used while increasing the advantageous effect mentioned above.

With the vehicle alternator of the illustrated embodiment, each of the protective partitioned compartments surrounds a circumference of a distal end of each stator lead axially extending through the frame and protruding into the electric component-part compartment.

With such a structure, no need arises for the stator leads to extend through the protective partitioned compartment to reach an area inside the protective partitioned compartment, enabling the provision of a simplified structure and increased waterproof capability of the protective partitioned compartment.

With the vehicle alternator of the illustrated embodiment, the plurality of protective partitioned compartments is located on an inner peripheral wall of the end cover at circumferentially equidistant intervals.

With such a structure, each protective partitioned compartment evenly increases mechanical strength of the outer circumferential wall of the resin-made end cover. As used herein, the term "substantially equidistant intervals" refers a definition that has a tolerance in dimension in the order of 20%.

DETAILED DESCRIPTION OF PREFERRED EMBODIMENTS

Now, a vehicle alternator of one embodiment according to the present invention will be described below in detail with reference to the accompanying drawings. However, the present invention is construed not to be limited to such an embodiment described below and technical concepts of the present invention may be implemented in combination with other known technologies or the other technology having functions equivalent to such known technologies.

In the following description, it is to be understood that such terms as "front", "rear", "parallel", "radial", "axial", "axially", "rotational", "inward", "outside", "downward", "toward" and the like are words of convenience and are not to be construed as limiting terms.

(Overall Structure)

The vehicle alternator of the present embodiment will be described below with reference to FIG. 1.

Figure 1:
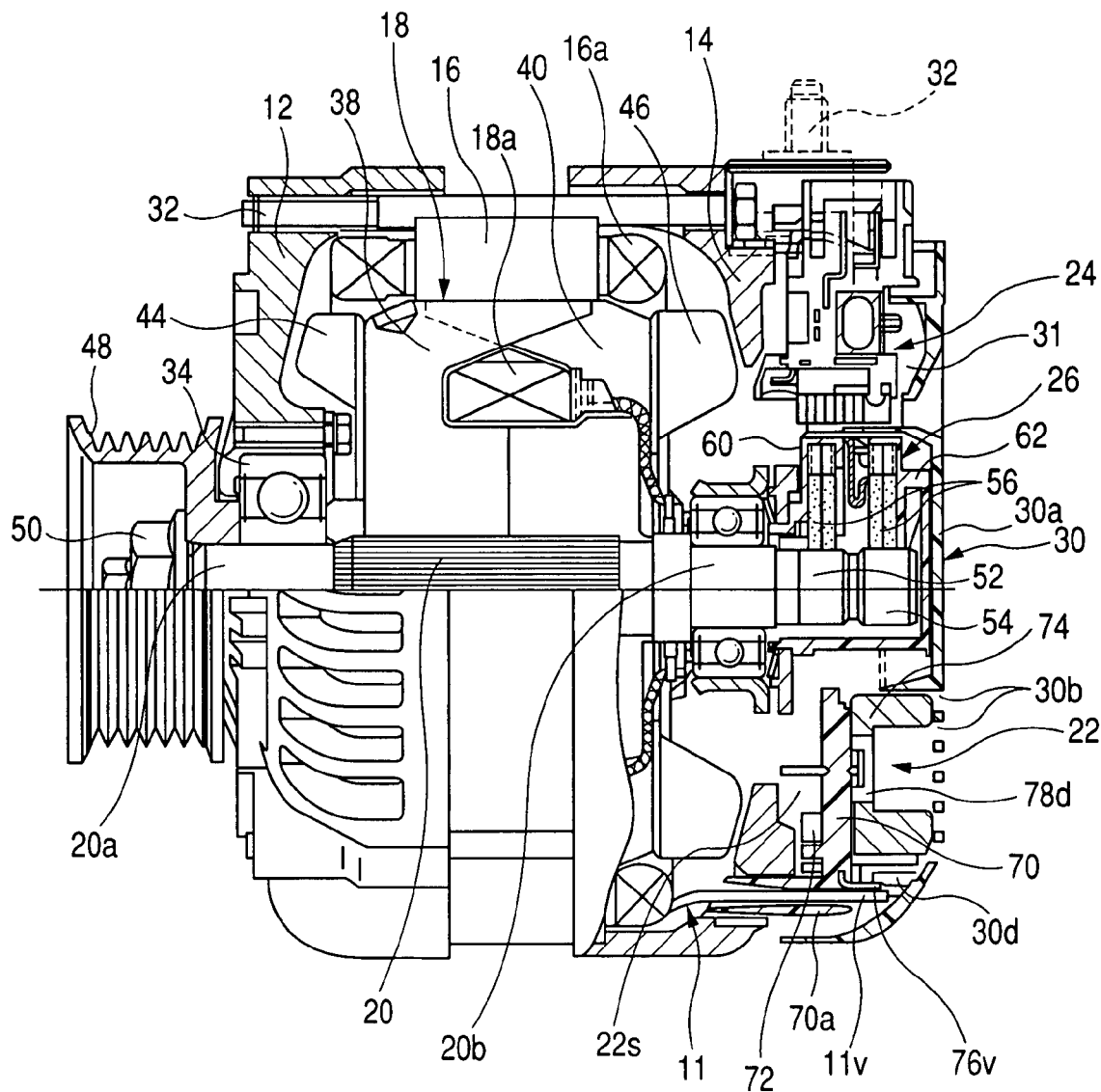
FIG. 1 is a longitudinal cross sectional view of a vehicle alternator of a first embodiment according to the present invention.

As shown in FIG. 1, the vehicle alternator 10 includes a bowl-shaped front frame 12, a bowl-shaped rear frame 14, a stator 16 supported with the front and rear frames 12, 14 and having a stator coil 16a for generating an A.C. power output, a Lundell-type rotor 18, having a field winding 18a, which is carried on a rotary shaft 20 rotatably supported with the front and rear frames 12, 14 to be rotatable inside the stator 16, a rectifier unit 22 for converting A.C. power output, generated by the stator coil 16a, into a D.C. power output, a voltage regulator 24 regulating the D.C. power output, rectified by the rectifier unit 22, at a desired output voltage, and a brush unit 26 fixedly mounted on the rear frame 14 in an area above slip rings 52, 54 carried on the rotary shaft 204 for supplying excitation current to the field winding 18a via the slip rings 52, 54, a bowl-shaped end cover 30 fixedly secured to the rear frame 14 for defining an electric component-part compartment 31 to accommodate therein electric devices such as the rectifier unit 22, the voltage regulator 24 and the brush unit 26, and an output terminal 32. The voltage regulator 24 is placed on the same radial plane as the brush unit 26 in an area radially outside the brush unit 26.

Further, centrifugal type front and rear cooling fans 44 and 46 are fixedly mounted on the front and rear pole cores 38, 40 for drawing and directing cooling airflows toward the stator coil 16a.

The bowl-shaped end cover 30 is formed from resin and has a base bottom wall 30a formed with a large number of cooling airflow windows 30b for admitting cooling airflow to the electric component-part compartment 31 from outside.

Both the front and rear frames 12, 14 are tightened to each other by means of a plurality of through-bolts 32 with the stator 16 being sandwiched in an axial direction. The front and rear frames 12, 14 carry thereon front and rear bearings 34, 36, which rotatably support the rotary shaft 20 to allow the Lundell-type rotor 18 to be rotatable within an inner periphery of the stator 16. The front and rear bearings 34, 36 are fixedly supported on the front and rear frames 12, 14, respectively.

The stator 16, fixedly supported with the front and rear frames 12, 14, includes the stator coil 16a composed of, for instance, a three phase winding to generate a three-phase AC voltage that is delivered to the rectifier unit 22 through stator coil leads 11. The rotor 18 includes front and rear pole cores 38, 40, carrying thereon the field winding 18a, which are fixedly supported on the rotary shaft 20.

In addition, the rotary shaft 20 has a front end 20a, on which a pulley 48 is fixedly mounted by means of a nut 50, to be rotatably driven with output torque of an engine (not shown) of a vehicle. Moreover, the rotary shaft 20 has a rear end portion 20b extending through the rear frame 14 to an area outside thereof and carries thereon the slip rings 52, 54 at given axially spaced positions. The slip rings 52, 54 are electrically connected to both ends of the field winding 18a, respectively.

The stator coil leads 11 actually include three-phase stator leads that axially extend from the stator coil 16a of the stator 16. More particularly, the stator coil leads 11 include three-phase wiring leads such as a U-phase stator lead 11u, a V-phase stator lead 11v and a W-phase stator lead 11w which are arranged in star connection. The stator coil leads 11, shown in FIG. 1, represents the V-phase stator lead 11v.

The electric component-part compartment 31 accommodates therein the rectifier unit 22, the voltage regulator 24 and the brush unit 26.

The brush unit 26 includes a pair of brushes 56 standing upright in an area immediately above the rear end 20b of the rotary shaft 20 and operatively held in sliding contact with the slip rings 52, 54, respectively, carried on the rear end 20b of the rotary shaft 20, a brush holder 60 having a brush accommodating section for accommodating therein the brushes 56, and a sealing plate member 62 for sealing a lower part of the brush holder 60 while covering outer peripheries of the slip rings 52, 54.

The voltage regulator 24 is fixedly mounted on the rear frame 14 in a position radially outward the brush unit 26.

The rectifier unit 22 is fixedly mounted on a rear end face of the rear frame 14 on substantially the same radial plane as the voltage regulator 24 and the brush unit 26. In addition, the rectifier unit 22 is placed in a horseshoe-shaped airspace 22S, defined in the electric component-part compartment 31, in which none of the voltage regulator 24 and the brush unit 26 are occupied.

The rectifier unit 22 includes an insulating terminal block 70 having a sleeve-like protrusion 70a having a front end press fitted to the rear frame 14. The rectifier unit 22 further includes a horseshoe-shaped negative-side cooling fin 72 and a horseshoe-shaped positive-side cooling fin 74, which are fixedly mounted on the insulating terminal block 72 on both sides thereof. The horseshoe-shaped negative-side cooling fin 72 faces the rear frame 14 and the horseshoe-shaped positive-side cooling fin 74 faces the end cover 30, with the horseshoe-shaped negative-side cooling fin 72 and the horseshoe-shaped positive-side cooling fin 74 being axially spaced from each other by a given distance by means of an electrically insulating member.

The vehicle alternator 10 of the present embodiment has the other same structure as that of a usual vehicle alternator and operates in the same manner as that of the usual vehicle alternator. Therefore, the vehicle alternator 10 of the present invention will be described below further in detail with a focus on unique features of the present invention.

(Rectifier Unit 22)

Figure 2:
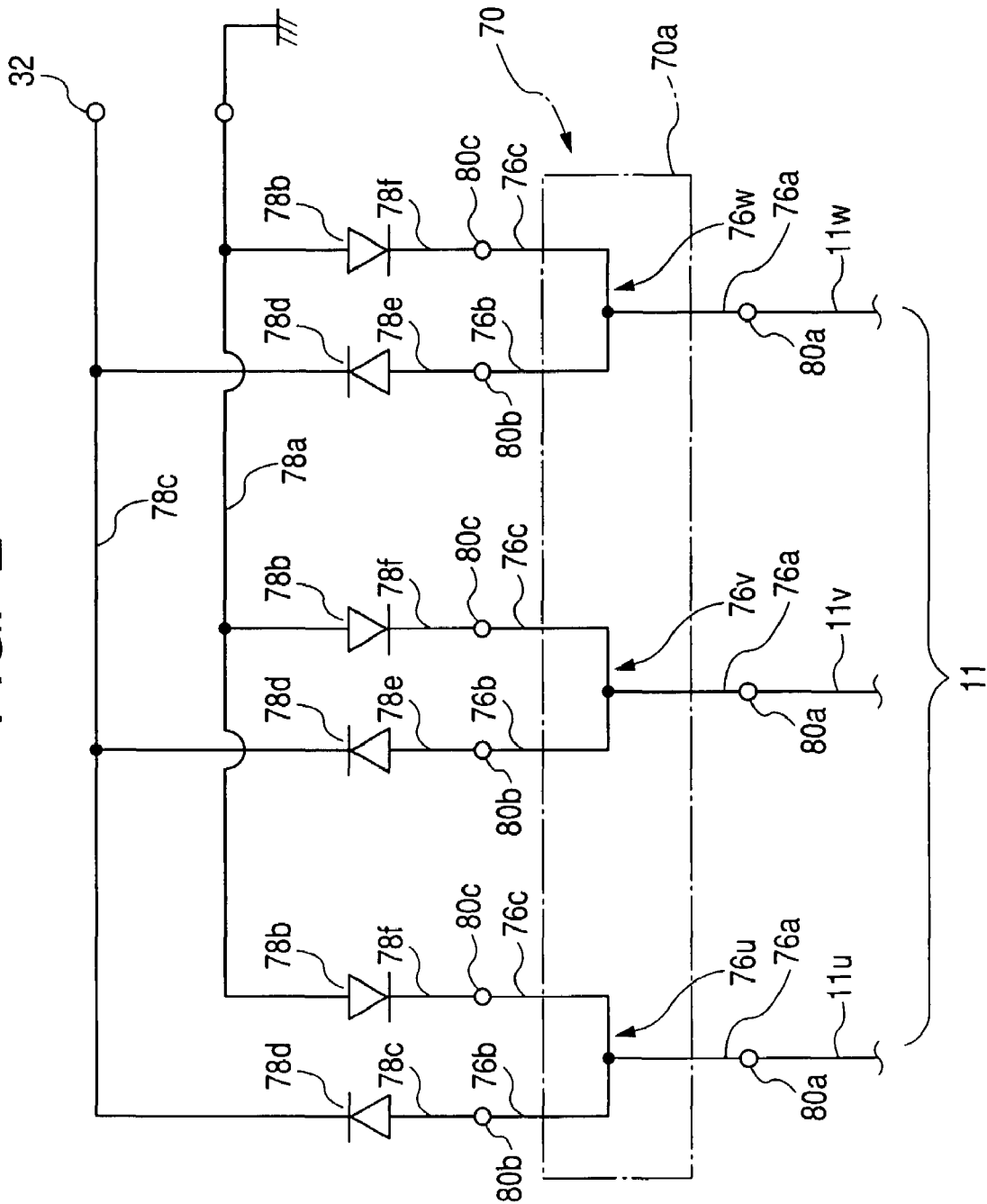
FIG. 2 is a rear view of the vehicle alternator with a rectifier unit as viewed on a rear side of the vehicle alternator shown in FIG. 1.

The rectifier unit 22 is described below further in detail with reference to a circuit diagram shown in FIG. 2.

The terminal block 70 includes a resin board 70a embedded with A.C conductive segments 76u, 77v, 76w by insert molding which axially extend between the negative-side cooling fin 72 and the positive-side cooling fin 74.

The A.C conductive segments 76u, 77v, 76w include exposed end portions 76a, 76b, 76c, respectively, with the exposed terminal 76a protruding from an end face 76b of the resin board 70a and the exposed end portions 76b and 76c protruding from the other end face 76c of the resin board 70a. The exposed end portions 76a play a role as exposed end terminals for connection to the stator leads 11u, 11v, 11w, respectively. The exposed end portions 76b play a role as exposed end terminals for connection to diode leads 78e, serving as anode electrodes, of upper arm-side rectifying elements 78d, respectively. Likewise, the exposed end portions 76c play a role as exposed end terminals for connection to diode leads 78f, serving as cathode electrodes, of lower arm-side rectifying elements 78b, respectively. The diode leads 78e, 78f protrude from respective rectifying element bodies in a substantially axial direction.

With the vehicle alternator 10 of the present embodiment, the exposed end portions 76a are connected to the stator leads 11u, 11v, 11w at connecting portions 80a, respectively, by soldering. The exposed end portions 76b are connected to the diode leads 78e at connecting portions 80b, respectively, by soldering. Likewise, the exposed end portions 76c are connected to the diode leads 78f at connecting portions 80c, respectively, by soldering. In addition, the upper arm-side rectifying elements 78d have sleeve-like cathode electrodes press fitted to the positive-side cooling fin 74. Likewise, the lower arm-side rectifying elements 78b have sleeve-like anode electrodes press fitted to the negative-side cooling fin 72. Thus, no soldering is needed for these connections.

The upper arm-side rectifying elements 78d have anodes electrically connected to the output terminal 32 through a wiring lead 78c in star connection. The lower arm-side rectifying elements 78b have cathodes connected to ground through a wiring lead 78a.

Layouts of the connecting portions 80a, 80c are described below in detail with reference to FIG. 3.

Figure 3:
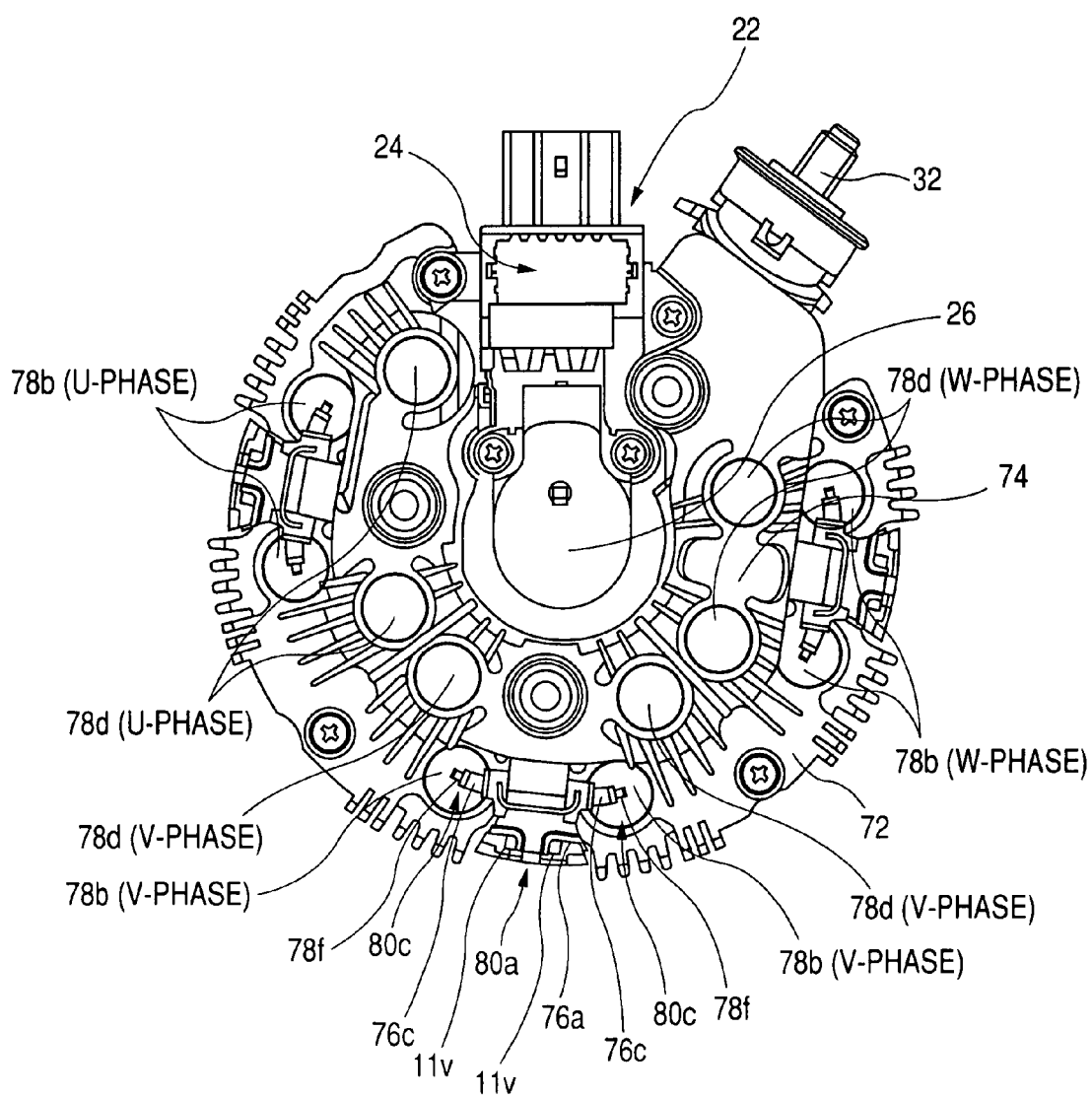
FIG. 3 is a fragmentary enlarged view showing an insulating terminal block and an end cover with featured structures of the first embodiment.

As will be apparent from FIG. 3 representing a rear view of the rectifier unit 22, the negative-side cooling fin 72 has the horseshoe-shaped structure that is larger in diameter than the positive-side cooling fin 74. The diode leads 78f, press fitted to associated holes of the negative-side cooling fin 72, of the lower arm-side rectifying elements 78b axially extend with the stator leads 11 to reach a radially outside periphery of the positive-side cooling fin 74. The exposed end portions 76a, axially protruding from the terminal block 70, are placed adjacent to the stator leads 11 and bent in an axial direction for soldering, thereby forming the connecting portions 80*a*. Likewise, the exposed end portions 76*c*, axially protruding from the terminal block 70, are placed adjacent to the diode leads 78*f* and bent in the axial direction for soldering, thereby forming the connecting portions 80*c*.

In FIG. 3, further, the upper arm-side rectifying elements 78*d* and the lower arm-side rectifying elements 78*b* are mounted in pairs, respectively, each for one phase. Thus, the diode leads 78*f* axially extend from the end face 70*c* of the terminal block 70 in connection with the stator leads 11*u*, 11*v*, 11*w*, respectively. A pair of connecting portions 80*c* is located on both circumferential sides of each connecting portion 80*a*. Further, each stator lead 11 includes two components for each phase and the two stator leads 11 on the same phase axially extend in closed relationship and soldered to the exposed terminal 76*a* of the A.C. conductive segment.

Accordingly, to be exact, the connecting portions 80*a* between the stator leads 11*u*, 11*v*, 11*w* and the exposed end portions 76*a* and the connecting portions 80*c* between the diode leads 78*f* and the exposed end portions 76*c* are provided in two positions, respectively, for each phase. As will be apparent from FIG. 3, however, the connecting portions 80*a* and 80*c* in the two positions for the same phase are located in areas close proximity to each other. The output terminal 32 is fixedly mounted on the negative-side cooling fin 72 at an upper end thereof and protrudes upward from the end cover 30.

(End Cover 30)

The end cover 30 will be described below in detail with reference to FIG. 4.

Figure 4:
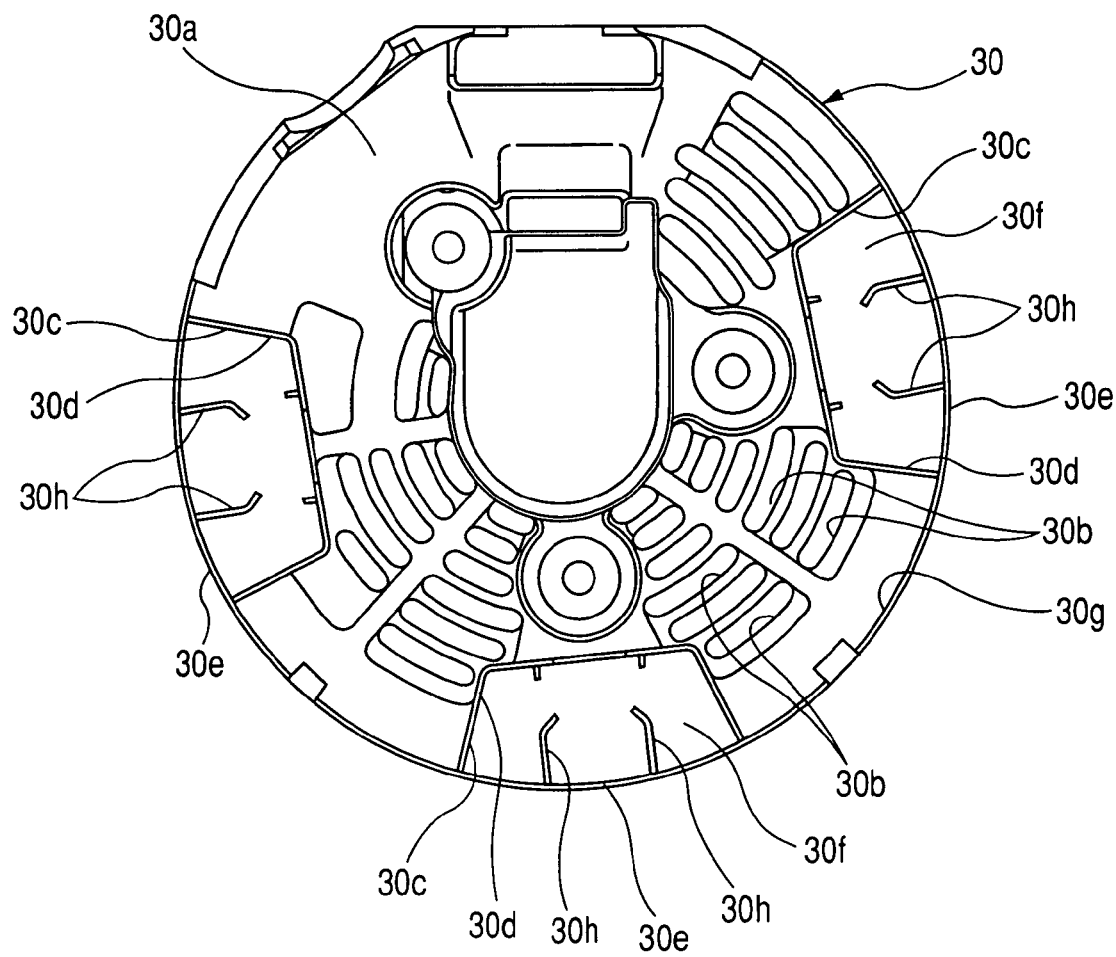
FIG. 4 is a fragmentary enlarged view showing an insulating terminal block and an end cover with featured structures of a second embodiment according to the present invention.

FIG. 4 is a front view representing an inside of the end cover 30 with the inside thereof viewed from a front area in an axial direction.

The end cover 30, made of resin and formed in a bowl shape, includes three protective partitioned compartments 30*c* formed on the base end wall 30*a* at circumferentially spaced positions corresponding to associated electric components in three phases. Each of the protective partitioned compartments 30*c* includes a partition wall 30*d*, a circumferential wall portion 30*e* and an end wall portion 30*f*. The cooling airflow windows 30*b* are formed in the base wall portion 30*a* at radially and circumferentially spaced positions. Reference 30*g* designates an inner peripheral wall of the circumferential wall portion 30*e*.

With a feature of the vehicle alternator 10 of the present embodiment, each of the protective partitioned compartments 30*c* is integrally formed with the base wall portion 30*a* of the end cover 30 in a C-shape configuration in radial cross section as shown in FIG. 4. The partition wall 30*d* of each protective partitioned compartment 30*c* axially extends inward from the end wall portion 30*e* of the end cover 30 and has radially outward ends contiguous with the inner peripheral wall 30*g*. This allows the partition wall portion 30*d* and the circumferential wall portion 30*e* of each protective partitioned compartment 30*c* to collectively surround the exposed end portions 76*a*, 76*c* of the A.C. conductive segment (such as, for instance, 76*v*) for the same phase.

The partition walls 30*d* have axial leading ends held in face-to-face relationship with a rear end face of the terminal block 70 or the rear end face of the rear frame 14 with a small clearance therefrom. The partition walls 30*d* of the protective partitioned compartments 30*c* for respective phases are placed on the inner peripheral wall 30*g* of the base wall portion 30*a* of the end cover 30 at nearly and equidistantly spaced angular positions as shown in FIG. 4. However, since the brush unit 26 is present in a radiated upper area, the present invention may take any other profile in layout of the partition walls 30*d*.

In FIG. 4, each protective partitioned compartment 30*c* has a pair of substantially radially extending protector walls 30*h* for protecting the connecting portion 80*a* from water drops while preventing the connecting portion 80*a* from being brought into electrical contact with other electrical component in short-circuited.

(Advantageous Effects)

With the vehicle alternator 10 of the present embodiment, the protective partitioned compartments 30*c* have the advantageous effects listed above. In addition, each of the partition wall portions 30*d* may be formed with a few apertures, recesses, slits or cutouts. The presence of such apertures, recesses, slits or cutouts promotes water drops to enter the inside of the partition wall portions 30*c*. At least more than 90% of the circumference in a radial cross section covering the connecting portions 80*a*, 80*c* may be preferably surrounded with each the partition wall portion 30*d*.

With such a structure of the end cover 30, each protective partitioned compartment 30*c* can prevent water droplets, accompanied by the cooling airflows passing through the cooling airflow windows 30*b* formed in the base wall portion 30*a*, from adhering onto the connecting portion present in an area close to the cooling airflow windows 30*b*. Thus, the occurrence of corrosion or rusting of the connecting portion can be minimized, thereby providing increased reliability in operation of the vehicle alternator for a prolonged period of time.

(Modified Form)

While the vehicle alternator of the present embodiment has been described with reference to a structure wherein circumferences of both the connecting portions 80*a*, 80*c* are collectively surrounded with the partition wall 30*d*, the present invention is not limited to such a structure and the connecting portions may be individually surrounded with the partition wall 30*d*.

While the specific embodiment of the present invention has been described in detail, it will be appreciated by those skilled in the art that various modifications and alternatives to those details could be developed in light of the overall teachings of the disclosure. Accordingly, the particular arrangement disclosed is meant to be illustrative only and not limited to the scope of the present invention, which is to be given the full breadth of the following claims and all equivalents thereof.

What is claimed is:

1. A vehicle alternator comprising:

a frame surrounding a stator, having a stator coil formed in multi-phase windings, and a rotor rotatably disposed in an area inside the stator;

a bowl-shaped end cover, made of resin, which is mounted on an end face of the frame to cover the same for defining an electric component-part compartment;

a rectifier unit fixedly mounted on the end face of the frame and accommodated in the electric component-part compartment; and stator leads extending through the frame from the stator coil of the stator into the electric component-part compartment;

the rectifier unit including:

a positive-side cooling fin to which cathode electrodes of upper arm-side rectifying elements and an output terminal are fixed;

a negative-side cooling fin to which anode electrodes of lower arm-side rectifying elements are fixed; and a terminal block embedded with A.C. conductive segments for respective phases each providing electrical connection between a diode lead acting as the anode electrode of the upper arm-side rectifying element and a diode lead acting as the cathode electrode of the lower arm-side rectifying element for each phase, the terminal block including a resin board formed in a horseshoe-shape;

wherein:

the end cover includes a base wall portion, made of resin and mounted on the end face of the rear frame in face-to-face relation thereto, and a plurality of protective partitioned compartments, integrally formed with the base wall portion at circumferentially spaced positions for the multi-phase windings, respectively, which axially protrude from the base wall portion toward the frame and each of which has both radially outward ends contiguous with an inner periphery of a circumferential wall portion of the base wall portion;

each of the protective partitioned compartments surrounds at least one circumference of a connecting portion between an exposed end portion of each of the A.C. conductive segments and the diode lead and a connecting portion between the exposed end portion of each of the A.C. conductive segments and the stator lead and each of the protective partitioned compartments encompasses a pair of the lower arm-side rectifying elements for each phase; and the positive-side cooling fin and the negative-side cooling fin have horseshoe-shapes, respectively, with the negative-side cooling fin begin larger in diameter than the positive-side cooling fin.

2. The vehicle alternator according to claim 1, wherein:
each of the protective partitioned compartments surrounds both circumferences of the connecting portion between the exposed end portion of each of the A.C. conductive segments and the diode lead and the connecting portion between the exposed end portion of each of the A.C. conductive segments and the stator lead.

3. The vehicle alternator according to claim 2, wherein:
each of the protective partitioned compartments surrounds a circumference of a distal end of each stator lead axially extending through the frame and protruding into the electric component-part compartment.

4. The vehicle alternator according to claim 2, wherein:
the plurality of protective partitioned compartments are located on an inner peripheral wall of the end cover at circumferentially equidistant intervals.

5. The vehicle alternator according to claim 2, wherein:
each of the protective partitioned compartments has a substantially C-shape in cross section.

6. The vehicle alternator according to claim 1, wherein:
each of the protective partitioned compartments has substantially radially extending protector walls for protecting each of the A.C. conductive segments.

* * * * *